(12) United States Patent
Alfoldi et al.

(10) Patent No.: US 7,458,807 B2
(45) Date of Patent: Dec. 2, 2008

(54) GAS HEATER, A GAS SUPPLY APPARATUS AND A METHOD OF PROVIDING GAS

(75) Inventors: Csaba Alfoldi, Brussels (BE); Lieve De Paepe, Muizen (BE)

(73) Assignee: Air Products and Chemicals, Inc., Allentown, PA (US)

( * ) Notice: Subject to any disclaimer, the term of this patent is extended or adjusted under 35 U.S.C. 154(b) by 327 days.

(21) Appl. No.: 11/111,453

(22) Filed: Apr. 21, 2005

(65) Prior Publication Data

US 2005/0241632 A1 Nov. 3, 2005

(30) Foreign Application Priority Data

Apr. 21, 2004 (EP) .................................. 04252324

(51) Int. Cl.
*F23D 11/44* (2006.01)

(52) U.S. Cl. .......................................... 431/11; 431/11

(58) Field of Classification Search .................. 431/11, 431/326, 328, 207, 208, 89; 422/202; 123/553; 392/484, 492, 493, 496; 165/135
See application file for complete search history.

(56) References Cited

U.S. PATENT DOCUMENTS

| 2,401,797 | A | | 6/1946 | Rasmussen | |
|---|---|---|---|---|---|
| 3,833,791 | A | * | 9/1974 | Schladitz | 392/485 |
| 4,795,618 | A | * | 1/1989 | Laumen | 422/202 |
| 5,443,053 | A | * | 8/1995 | Johnson | 123/557 |
| 5,520,211 | A | * | 5/1996 | Schonstein et al. | 137/340 |
| 6,345,611 | B1 | * | 2/2002 | Hartman et al. | 123/553 |
| 7,207,191 | B2 | * | 4/2007 | Zhu et al. | 62/612 |
| 2001/0030040 | A1 | | 10/2001 | Xiao | |
| 2002/0108743 | A1 | * | 8/2002 | Wirtz | 165/185 |
| 2003/0154700 | A1 | | 8/2003 | Rothig | |

FOREIGN PATENT DOCUMENTS

GB 2292 395 6/1928

OTHER PUBLICATIONS

International Search Report completed Oct. 5, 2004.

* cited by examiner

*Primary Examiner*—Steven B McAllister
*Assistant Examiner*—Chuka C Ndubizu
(74) *Attorney, Agent, or Firm*—Willard Jones, II (57) ABSTRACT

The invention provides a gas heater for connection to a heat source and a pressurized gas source, the gas heater comprising: a jacket having an inlet and an outlet and defining a cavity there between; a porous heat exchanger extender within said cavity, and means for providing heat to said heat exchanger along the length thereof. The invention also provides a gas supply apparatus and a method of providing gas.

9 Claims, 9 Drawing Sheets

GAS HEATER, A GAS SUPPLY APPARATUS AND A METHOD OF PROVIDING GAS

BACKGROUND OF THE INVENTION

The present invention relates to a gas heater, a gas supply apparatus and a method of providing gas.

In a conventional gas supply system, typically, a high-pressure gas source is connected to a gas pressure regulator. The gas pressure regulator is operable to regulate a reduction in the pressure of gas from the high-pressure at which the gas was stored at source to a desired working pressure. Typically, gas is stored in high pressure cylinders at pressures of approximately 200 bar. Commonly available regulators have been designed to operate at this level of intake gas pressure.

Recently, gas has been provided at higher pressures from within cylinders. For example, it is now possible to obtain 300 bar pressure gas cylinders. Manufacturers of pressure regulators were requested to offer 300 bar regulators using similar designs as those used for 200 bar input pressures. The difference between the regulators for operating at 300 bar compared to those designed to operate at 200 bar is the input pressure range on the gauges, and that an adapted valve control unit is required having a stronger spring or a diaphragm.

As gas expands it is known to undergo the Joule-Thomson effect, i.e. the cooling of a gas as it expands. The reduction in temperature as gas expands is related to the change in pressure of the gas. If initially the gas is at a higher pressure (for example of about 300 bar as opposed to a pressure of about 200 bar), and in both cases the gas is regulated to the same working pressure (for example about 10 bar), the gas that started at higher pressure (300 bar) will be substantially cooler than that that started at the lower pressure. Thus, the temperature of a pressure regulator becomes much lower in comparison when the input pressure of gas received by it is for example about 300 bar as opposed to about 200 bar.

In fact, this higher-pressure effect, starts to be prominent at above about 240 bar and it is further amplified by lower ambient temperatures. It is not uncommon in such situations for the pressure regulator to freeze. This can render the pressure regulator useless. Alternatively, problems such as output flow oscillation, blocking of regulator functionality and resulting leakage can occur.

There are known systems that have been developed in attempts to address this problem. One type of system relies on heating the gas at high pressure between the gas source and the pressure regulator. This is done by directing the gas through a length of straight or coiled tube which is heated. However, such systems are unable to provide sufficient heat to the gas without becoming either dangerously hot themselves or requiring unfeasibly long lengths of tubing.

An alternative attempt at a solution to this problem has been to heat the pressure regulator directly so that as gas passes through it and cools due to the Joule-Thomson effect, the temperature of the regulator device does not go below a lowest possible working temperature of the regulator. In other words, the regulator is heated so that the problems described above are moderated but still encountered.

Again, such attempts to solve the problem identified above have been unsuccessful. In particular, both the above mentioned attempts at a solution to this problem have low efficiency. This means that even if large amounts of input energy are used, with the intention of increasing the temperature of the gas sufficiently, it has not been possible to ensure that problems with the regulator do not occur.

United States Patent Application No. 2003/0154700 discloses a module for use as a filter, catalytic converter or heater.

According to a first aspect of the present invention there is provided a gas heater for connection to a heat source and a pressurised gas source, the gas heater comprising: a jacket having a gas inlet and a gas outlet and defining a cavity therebetween; and, a porous heat exchanger extending within said cavity, from said inlet to said outlet; and a heat provider for providing heat to said heat exchanger along the length thereof.

BRIEF SUMMARY OF THE INVENTION

The invention provides a gas heater having a gas inlet and a gas outlet defining a cavity there between and comprising and a porous heat exchanger extending within the cavity, from the inlet to the outlet. A heat provider for providing heat to the heat exchanger along the length of the heat exchanger is provided. The heat provider may be a contact surface between the jacket and the heat exchanger or a contact surface between the heat exchanger and a heating element provided within the heat exchanger.

According to a second aspect of the present invention there is provided a gas supply apparatus for connection to a pressurised gas source, the gas supply apparatus comprising: a gas heater according to the first aspect of the present invention; and, a pressure regulator having an input connected to an output of the gas heater, wherein the pressure regulator is arranged to receive heated gas from the gas heater and regulate the pressure thereof.

According to a third aspect of the present invention there is provided a method of providing gas from a pressurised source, the method comprising: feeding gas from a pressurised source to a gas heater; feeding gas from the heater to a pressure regulator to regulate the pressure thereof, wherein the gas heater is a gas heater according to the first aspect of the present invention.

According to a fourth aspect of the present invention there is provided a gas heater for connection to a heat source and a pressurised gas source, the gas heater comprising: a jacket; and, a porous heat exchanger contained within the jacket, arranged in use to receive heat and heat gas flowing through the heater wherein in use a distance between a flow of gas through the heater and a heat transfer surface through which the heat exchanger is arranged to receive heat is substantially constant.

In an embodiment, the invention provides a gas heater having a jacket containing a porous heat exchanger or heat exchange element. The porous heat exchanger is configured such that in use as gas passes through the jacket it contacts a large surface area of the heat exchanger. In use, if heat is applied to the jacket such that it is then fed to the heat exchanger, heat is efficiently transferred to the gas passing through the heater. Since the heat exchanger is selected such that a larger heat exchange surface area is exposed to the gas passing through than would otherwise be experienced by the gas, the length of the heat exchange zone within the heater can be reduced.

The gas heater of the present invention includes a porous heat exchanger arranged in use for receiving heat and heating gas flowing through the heater. The distance between a flow of gas in the heater and the heat transfer surface through which the heat exchanger is arranged to receive heat is substantially constant in the direction of flow of gas through the heater. In other words, for substantially all the journey of gas through the heater (and through the heat exchanger within the heater) the heat exchanger is arranged such that a heat transfer surface through which it receives heat is constant. This means that gas may be heated substantially uniformly as it passes through the heater and at substantially all parts of the path of gas through the heater it is possible to efficiently heat the gas.

By providing a porous heat conductive material as the heat exchanger, this ensures that heat may be transferred efficiently to the gas passing through the heater. Furthermore, in contrast to conventional gas heaters in which typically the contact time between the gas and heat source is very short due to the gas velocity being quite high e.g. up to 10 m/s, in the present invention the heat transfer is efficient due to the large heat exchange surface.

A slow gas velocity can be used because of the porous material. For example, velocities of between 0.005 and 0.5 m/s may be used. Indeed, in conventional systems the heat exchange surface is limited to the internal wall of the tube of the heater or a small internal surface of the regulator body and so turbulent gas flow has been required to improve heat transfer to the gas. This has necessitated the previously used high gas velocities. This contrasts markedly with the present invention.

Furthermore, in the present invention a heat exchanger is used that increases the heat exchange surface experienced by gas passing through the heater so the length of the heater can be reduced substantially in comparison to conventional tube heaters. Thus, it is easier and less disruptive to build such a heater in-line into a gas supply system.

In one example of an embodiment of the present invention, there is provided a heater for gas, the heater comprising: a jacket suitable for containing a high pressure flow of gas; a porous heat exchanger arranged to substantially fill the jacket; and, a heat deflector arranged within the heat exchanger for providing means to transfer heat from a heat source to the heat exchanger. The heat deflector may be of any suitable shape and/or configuration as described in detail herein. For example, it may be of spiral form optionally having a central bore for receiving a heating element. In all cases, the porous heat exchanger is arranged to fill all spaces within the jacket not taken up by the heat deflector. The materials used for the heater including the porous heat exchanger, jacket and heat defector may be as described in detail herein.

BRIEF DESCRIPTION OF SEVERAL VIEWS OF THE DRAWINGS

Examples of embodiments of the present invention will now be described in detail with reference to the accompanying drawings, in which:

FIGS. 3A to 3I show examples of heat jackets suitable for use with the gas heater of FIG. 2;

FIG. 9A to 9D show schematic representations of cross-sections through a part of a gas heater according to examples of an embodiment of the present invention; and, FIG. 10 shows the variation in temperature of a gas as it passes through a gas supply system of FIG. 1A or 1B with different heating arrangements being used.

DETAILED DESCRIPTION OF THE INVENTION

Figure 1A:
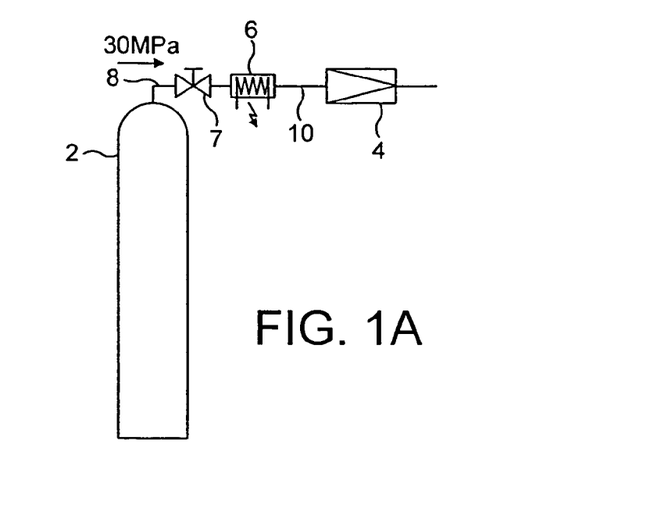
FIG. 1A is a schematic representation of an example of a gas supply system.

FIG. 1A is a schematic representation of a gas supply system according to an example of an embodiment of the present invention. The gas supply system comprises a high-pressure gas cylinder 2 connected to a pressure regulator 4 via a through-flow gas heater 6. Tubing 8 is provided to provide a conduit for gas from the cylinder to the heater 6. Tubing 10 is arranged to provide a conduit for gas from the heater 6 to the pressure regulator 4. A controllable valve 7 is provided for enabling control of the flow of gas from the cylinder 2 to the heater 6.

Figure 1B:
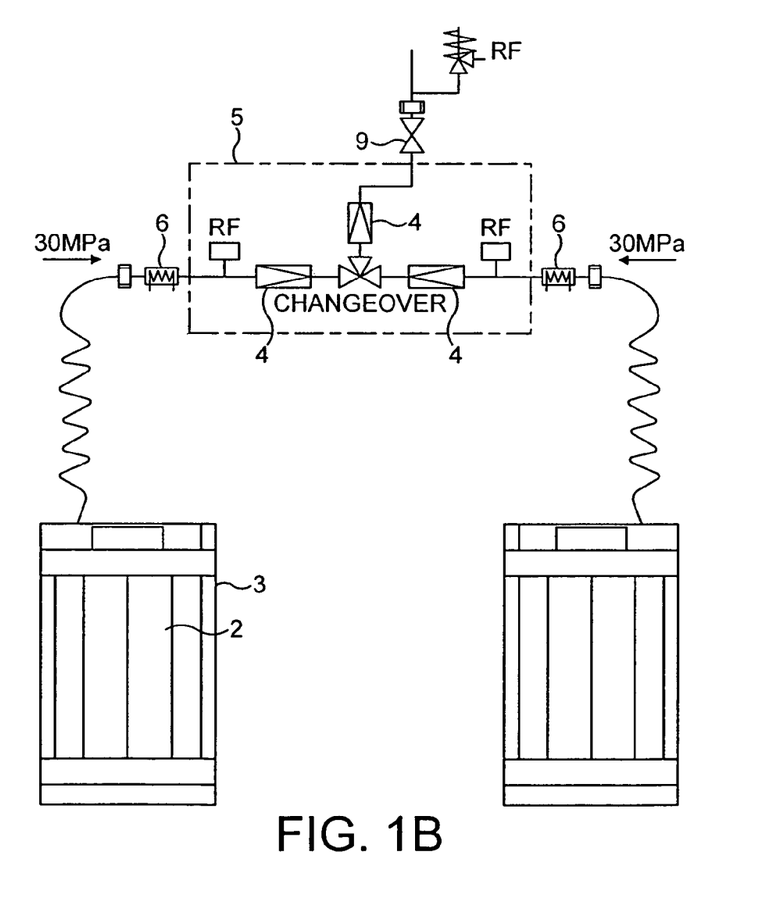
FIG. 1B is a schematic representation of another example of a gas supply system.

FIG. 1B is a schematic representation of a gas supply system according to another example of an embodiment of the present invention. In this example, equivalent components to those in the system of FIG. 1A are numbered with the same reference numerals. Additionally, a manifold 5 is provided to receive high pressure gas from one or more of the cylinders 2 within cylinder packs 3. In the specific example shown, a shut-off valve 9 is provided downstream of the manifold 5.

An example of a heater 6 suitable for use in the systems of FIGS. 1A and 1B will now be described in detail with reference to FIG. 2.

Figure 2:
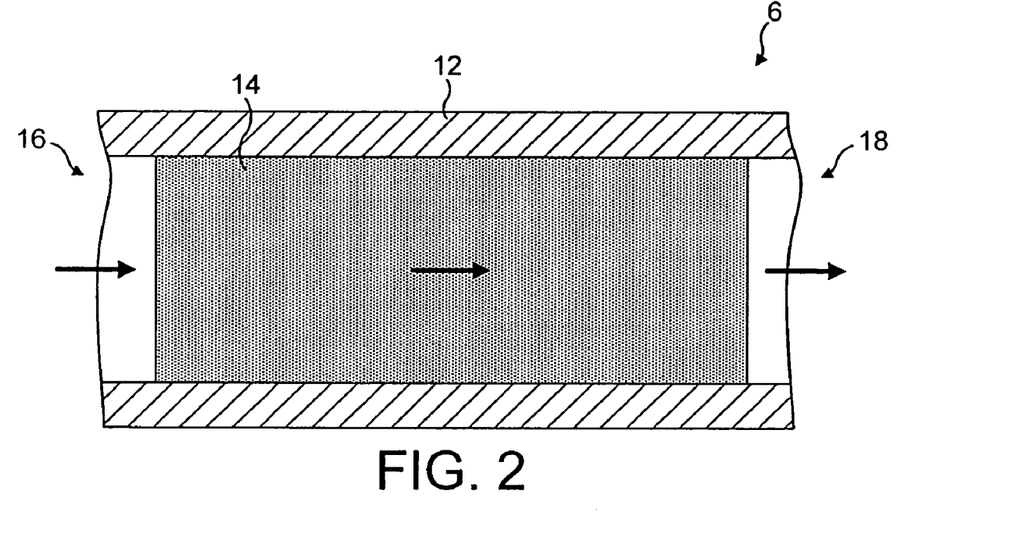
FIG. 2 shows a longitudinal cross-section through a gas heater according to an example of an embodiment of the present invention.

FIG. 2 shows a longitudinal cross-section through a gas heater suitable for use in the gas supply system of FIG. 1. The gas heater has a high-pressure jacket 12 in which is arranged a porous heat exchanger 14 i.e. a heat-conductive porous matrix functioning as a filling medium to fill the heater and provide a large heat exchange surface area for gas passing through the heater. A heat source (not shown) is also provided to provide heat to the gas passing through the heater 6. In the example shown, the heat jacket has an inlet 16 and an outlet 18 arranged to enable high-pressure gas to flow into and out of the heater 6, respectively.

In use, a heat source (to be described in more detail below) serves to heat the jacket 12 and thereby to provide heat to the filling medium 14. The material from which the filling medium is made is selected to be heat-conductive so that when the jacket 12 is heated, heat is transferred by conduction from the jacket 12 to the filling medium 14.

The filling medium 14 is selected such that it presents a heat exchange surface to gas passing through the heater that is larger than would be experienced by gas passing through the heater if the filling medium were not there. In a preferred example, a conductive porous material is provided as the filling medium. This serves a number of functions. In addition to increasing the heat exchange surface exposed to the gas passing through the heater 6, it slows down the gas as it passes through the heater 6 thereby increasing the residence time of gas in the heater 6. Accordingly, in contrast to conventional through-flow gas heaters in which gas flows quickly and is only exposed to an internal cylindrical heated surface as the heat exchange surface, in the example shown in FIG. 2, the heat exchange surface is significantly larger due to the porous nature of the filling medium 14 and so the gas velocity through the heater 6 may be much lower e.g. between about 0.005 and about 0.5 m/s.

The porous materials used as a heat exchanger may serve to establish layers of gas flow, i.e. lamina gas flow, through the heater providing good conditions for heat transfer to the gas.

The filling medium 14 is surrounded by the jacket 12. When the jacket is heated it will be appreciated that heat is provided to gas flowing through the heater throughout the length of the heater i.e. the length of the jacket. In other words, the distance between a flow of gas through the heater and a heat transfer surface through which the heat exchanger is arranged to receive heat is substantially constant in the direction of flow of gas through the heater. This is desirable since it means that gas may experience uniform heating throughout its passage through the heater.

Preferably the jacket and/or filling medium have a circular cross-section. Typically the cross-section of the filling medium when a porous material may be up to about 50 mm and preferably between about 14 and about 25 mm.

The gas is heated whilst still at high pressure and high density. For example if the gas is Argon at 300 bar, its density is about 450-550 kg/m$^3$.

The high-pressure jacket 12 is preferably made of a conductive material to enable a simple heat source to be used to provide heat to the heater 6. One example includes a heated collar arranged axially around the high-pressure jacket 12. Further examples will be described in detail below.

In a preferred example, the porous material used as the filling medium 14 is selected from the group consisting of copper, brass, bronze, aluminium, steel, stainless steel or other ferrous or non ferrous metals and their alloys. In fact, any suitable material may be used. To be suitable, a material must be heat-conductive so as to enable efficient transfer of heat from the high-pressure jacket 12 to the heat exchanger 14 and on to gas as it passes through the heater 6.

The high-pressure jacket 12 may similarly be made of any material that is suitably heat-conductive and sufficiently strong to act as a conduit or housing for high-pressure gas passing through the heater. Examples include, copper, brass, bronze, aluminium, steel, stainless steel and their alloys and other ferrous and non ferrous metals. In addition, the high-pressure jacket may also be reinforced with composite materials such as glass, aramid, carbon fibre or any other suitable material.

As mentioned above, the high-pressure jacket may be of any shape or form so long as it is capable of housing a heat exchanger that can be used to present a heat exchange surface to gas passing through the heater. FIGS. 3A to 3I show a number of examples of heat jackets suitable for use in the gas heater of FIG. 2. In FIG. 3A, the heat jacket 12 is a circular cylinder and a heating collar 20 is shown arranged axially around the jacket 12.

In each of FIGS. 3B and 3D to 3I, a central cylindrical bore 22 is provided within the jacket 12. The cylindrical bore 22 is for containing a filling medium such as a heat-conductor porous material acting as the heat exchanger. Furthermore, in each of FIGS. 3B and 3D to 3I, two or more axial bores 24 are provided to house heating rods. In use, a heating rod is inserted into one or more of the bores 24 of the high-pressure jacket 12. Thus, the jacket 12 is heated and this enables heat transfer to the filling medium 14 to occur.

Figure 3:
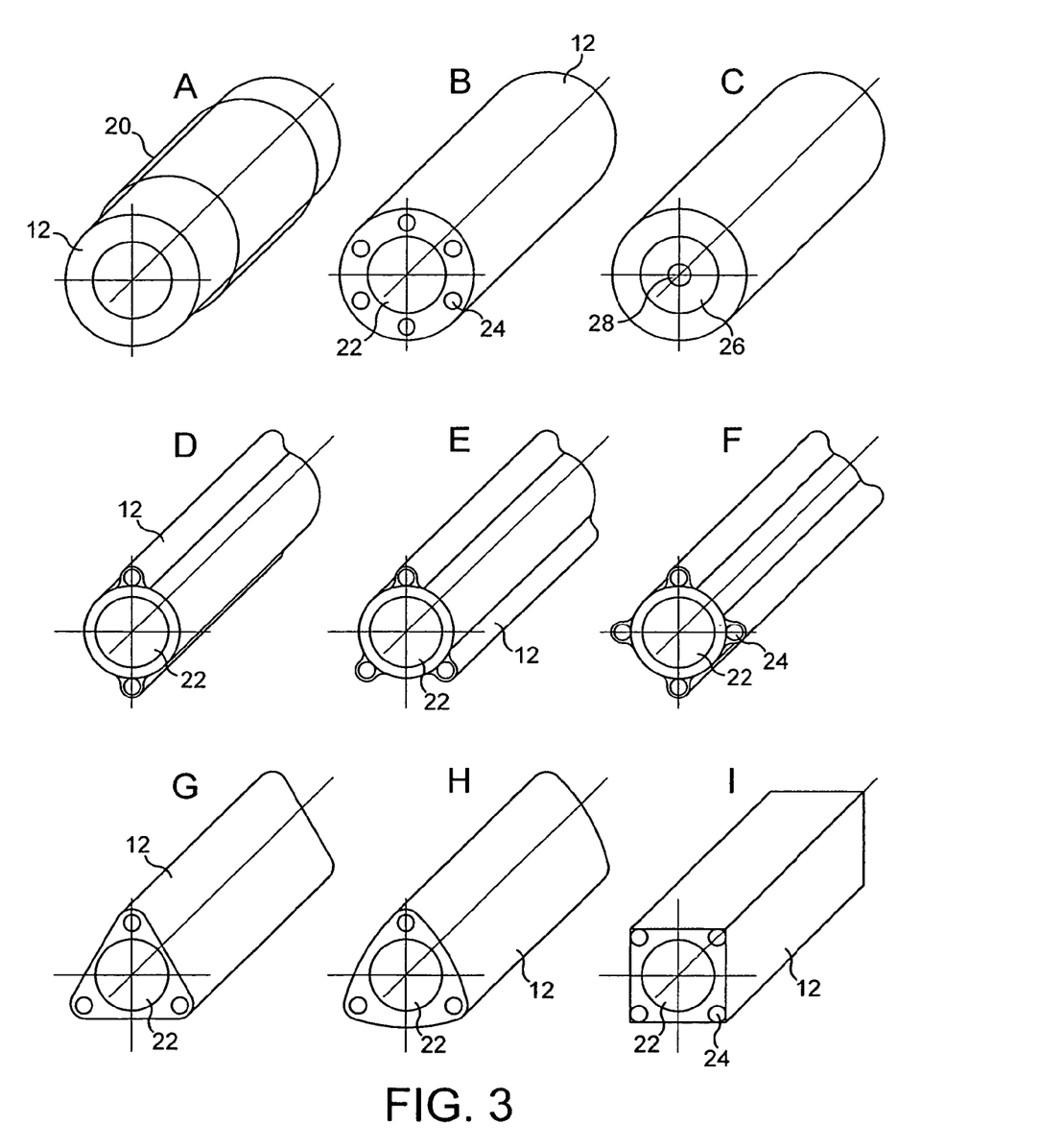

In the example shown in FIG. 3C, filling medium 26 is provided around a central heating element 28. Thus, in contrast to the other examples shown in FIG. 3, heat is provided from the inside of the filling medium as opposed to from the outside.

Figure 4:
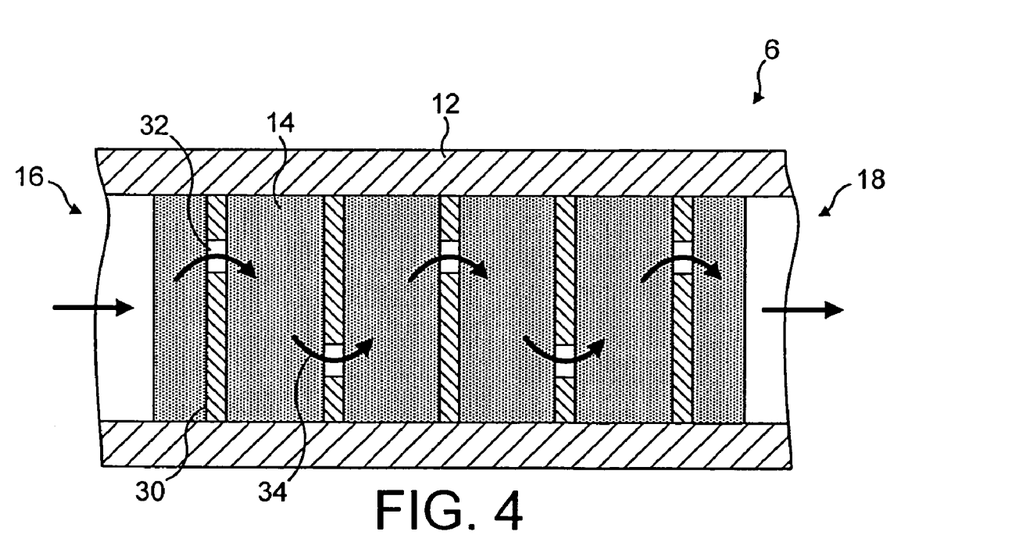
FIG. 4 shows a schematic representation of a cross-section through a further example of an embodiment of the present invention.

FIG. 4 shows a section through a gas heater according to an example of an embodiment of the present invention. Like the gas heater shown in FIG. 2, the heater 6 has a high-pressure jacket 12 and a filling medium 14 acting as a heat exchanger contained within it. In addition, an input 16 and an output 18 are provided to enable high-pressure gas to flow into and out of the heater, respectively.

The heater 6 also has a plurality of flow deflectors 30 arranged within the jacket 12. In the example shown, five separate flow deflectors 30 are shown, although, it will be appreciated that any number may be provided. In the example shown in FIG. 4, each flow deflector 30 comprises a disk fitted within the jacket 12. Each of the disks 30 has one or more through-holes 32 to provide a route and define a flow direction for gas as it passes through the heater 6. In the example shown, one through-hole is provided in each disk and the respective through-holes 32 of each of the disks 30 are staggered such that the gas is forced to take a torturous route through the heat exchanger 14. Accordingly, the residence time of the gas within the heater 6 is increased such that the efficiency of the heater is correspondingly increased. The route of the gas as it passes through the heater 6 is shown by arrows 34.

The flow deflector 30 may be of any shape suitable for defining a tortuous route for gas flowing through the heat exchanger within the heater. For example, instead of or as well as providing through-holes within the disks, the disks may be arranged such that they only contact a part of the jacket and gas can pass between the disk and the jacket where there is no contact between the disk and the jacket.

Preferably each flow deflector 30 is made of a heat conductive material so that it is able to function as a heat distributor, i.e. conduct heat from the jacket 12 to within the heat exchanger 14. This increases the even nature of heat distribution within the filling medium 14.

Figure 5:
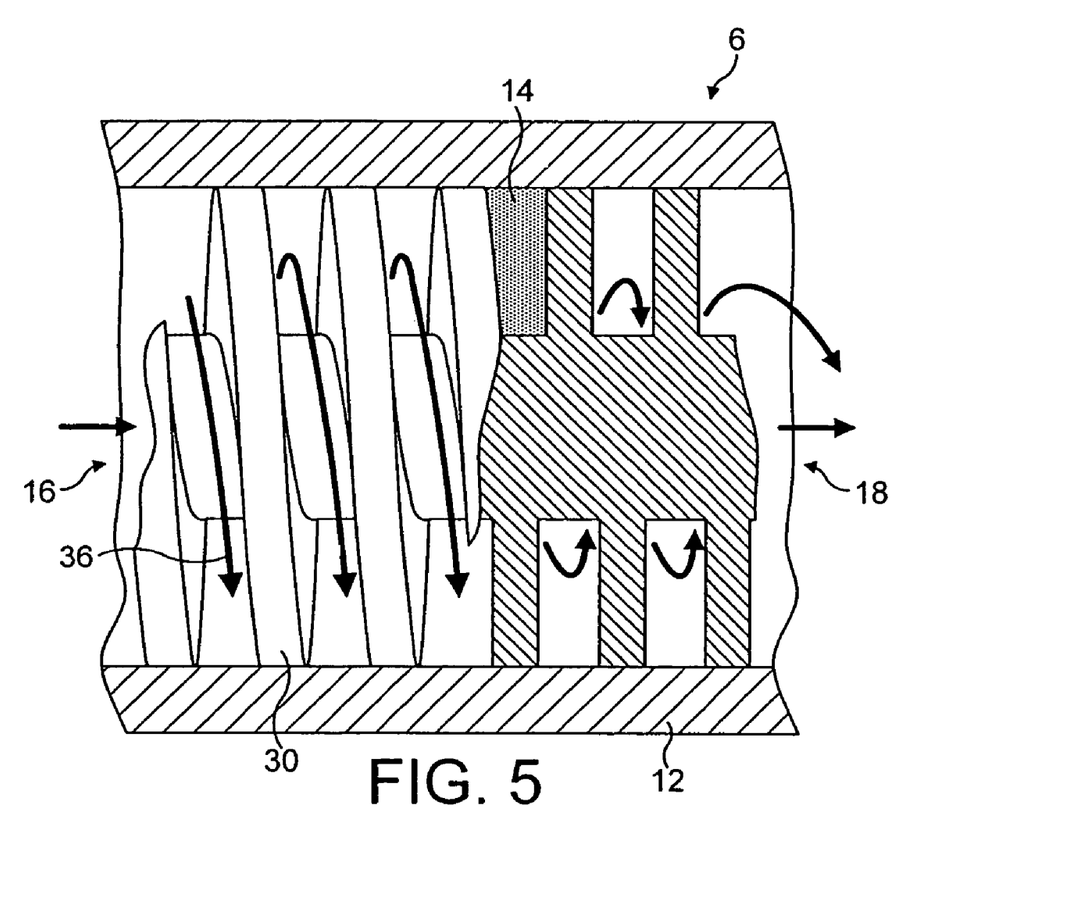
FIG. 5 shows a schematic representation of a cross-section through a further example of an embodiment of the present invention.

FIG. 5 shows a section through a through-flow gas heater 6 according to a further example of an embodiment of the present invention. Like the heater 6 in each of FIGS. 2 and 4, the heater 6 in FIG. 5 comprises a jacket 12 defining a housing having an inlet 16 and an outlet 18 to allow passage of high-pressure gas through the heater 6. The flow deflector 30 is preferably made from a solid heat-conductive material. In the example shown in FIG. 5, the flow deflector is a spiral metallic element contained within the jacket 12. Porous filling medium 14 is provided in the spaces between the spiral turns of the heat deflector 30. In the example shown in FIG. 5, heat is provided to the jacket 12 via a heat source (not shown).

In use, high-pressure gas enters the heater 6 via inlet 16 and is routed by the flow deflector 30 through the porous filling medium 14. Arrows 36 show the tortuous route that gas is forced to take by the flow deflector 30. It can be seen that gas is forced to take a relatively long route through the heater 6. Furthermore, due to the porous nature of the filling medium 14, the heat transfer surface experienced by the gas as it passes from the inlet 16 to the outlet 18 is relatively large. Significantly, it is substantially larger than the heat transfer surface it would experience if the filling medium 14 were not provided. The advantages this confers are explained in detail above.

Figure 6:
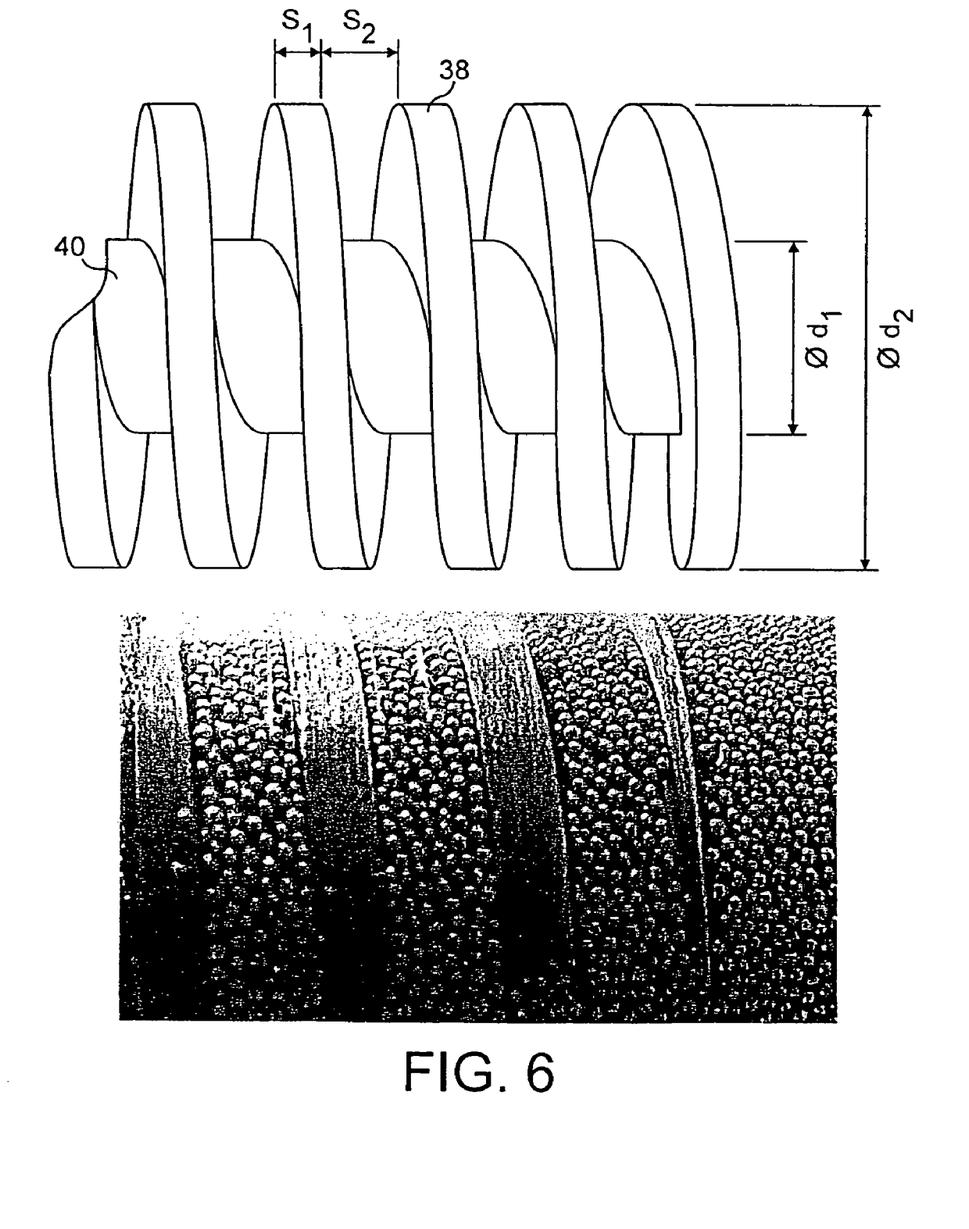
FIG. 6 shows a schematic representation of an insert for a gas heater.

FIG. 6 shown an example of the flow deflector used in the heater 6 of FIG. 5. The flow deflector 30 has a coil 38 of width $S_1$. The spacing or pitch between consecutive turns of the coil 38 is a distant $S_2$. The overall diameter of the heat deflector is $D_2$. The flow deflector 30 has a central shaft 40 of width $D_1$. It will be appreciated that by varying any or all of $S_1$, $S_2$, $D_1$ and $D_2$ the overall performance of the heater can be changed.

Figure 7:
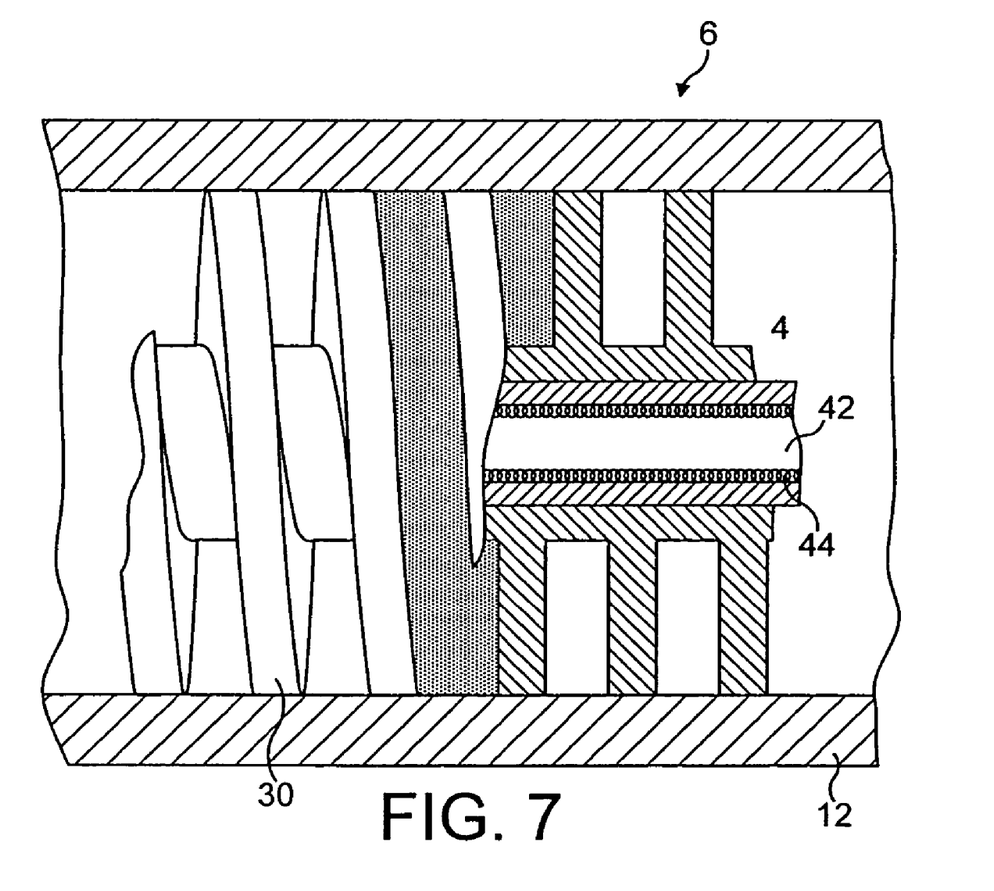
FIG. 7 shows a schematic representation of a cross-section through a gas heater according to an example of an embodiment of the present invention.
Figure 8:
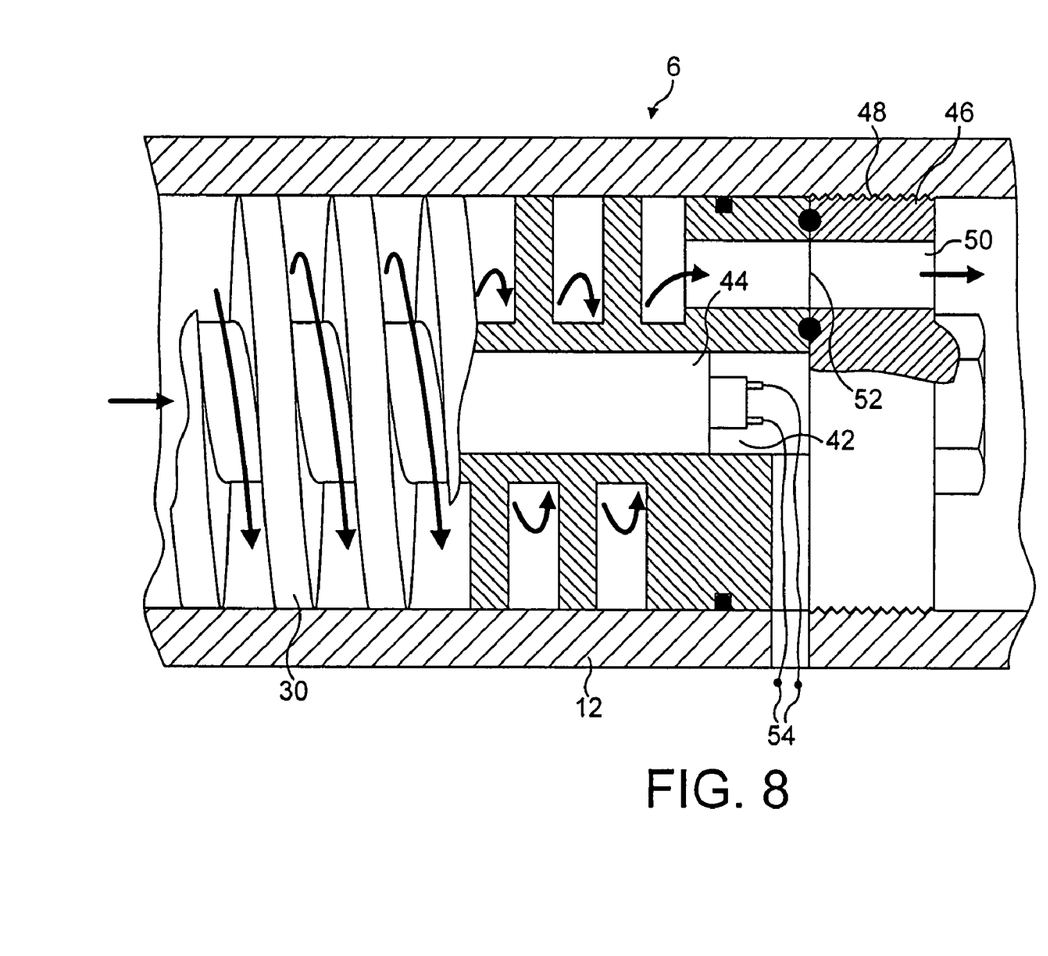
FIG. 8 shows a schematic representation of a cross-section through a gas heater according to an example of an embodiment of the present invention.

FIG. 7 shows a further example of a heater 6. In this example, a helical flow deflector 30 such as that shown in and described with reference to FIG. 6 is provided within jacket 12. In the example shown, the flow deflector 30 is heat-conductive and has a central axial bore 42 within which is arranged a heating element 44. FIG. 8 shows a view of another section through the heater of FIG. 7.

In addition to the component described above with reference to FIG. 7, the heater also comprises a locking element 46 provided in engagement with the inner wall of jacket 12. A mating thread 48 is provided between the locking element 46 and the jacket 12. The locking element 46 has a through-hole 50 arranged in use to coincide with an opening 52 at the right most end of flow deflector 30. This defines a passage for gas to leave the heater 6 after passage therethrough. In the example shown, the locking element 46 ensures that the flow deflector 30 is not forced out of the jacket 12 by the effect of the high-pressure gas it is arranged to receive.

The heater 44 shown in FIG. 8 is an electric heater and is provided with electric contacts 54 through which power may be provided to the heating element 44 such that it is able to provide heat to the heater 6. Any suitable type of heater may be used.

As mentioned above, the heat exchanger is preferably provided as a filling medium 40 such as a heat-conductive porous material.

In use, heat energy from a heat source is transferred from the jacket 12 to the porous heat exchanger through a cylindrical contact surface. Where a heat-conductive flow deflector is fitted, heat transfer to the heat exchanger is also achieved through the flow deflector as well as through the cylindrical contact surface.

Typically, the porous material is provided as a sintered or pressed material. The porous material is made up of a plurality of grains of the conductive porous material which can have any one of a number of desired shapes. FIGS. 9A to 9D show a number of examples of a section of the contact between the porous heat exchanger and the jacket of the heater. It can be seen that conductive bridges are formed between individual particles that enables heat to be transferred from the jacket 12 to within the porous material 14 via conduction.

Figure 9:
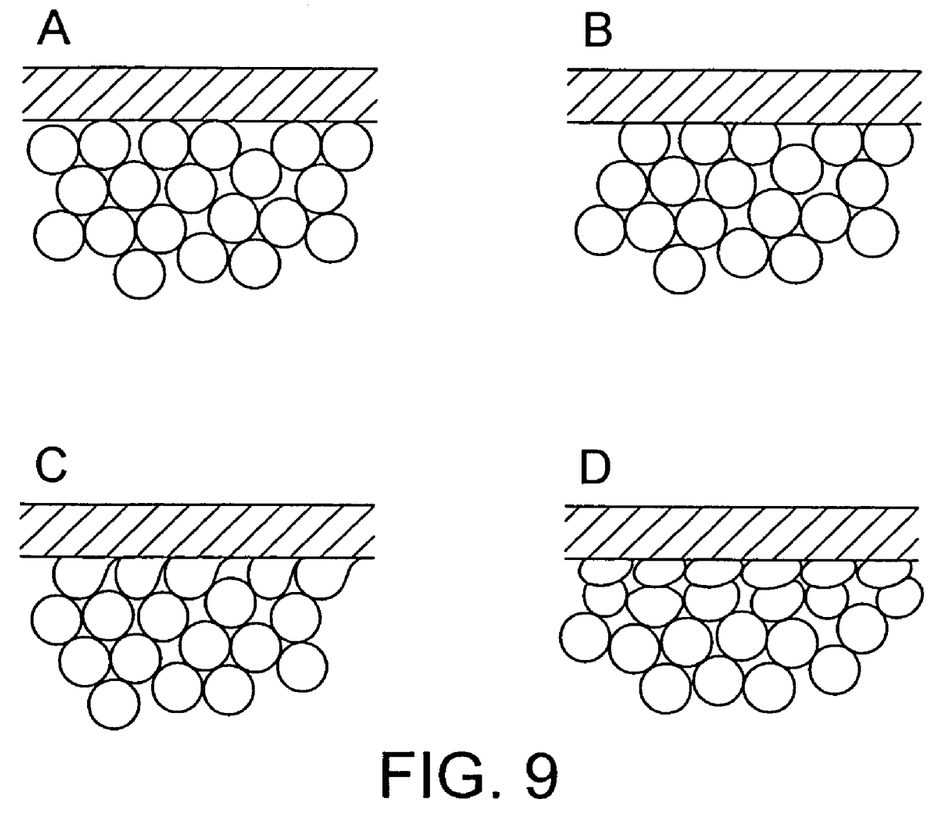

FIG. 9A shows a situation in which the porous heat exchanger has been fitted within the jacket 12. In other words, it has been lightly placed within the jacket 12.

In FIG. 9B, the porous material 14 has been arranged with an interference fit with the jacket 12. In other words it has been forced into a jacket 12 with some considerable force. This causes an improvement in the amount of contact between the particles of the porous material 14 and the jacket 12.

In the example of FIG. 9C, prior to fitting into the jacket 12, the porous material 14 is mechanically surface treated. In other words it is machined causing a deformation of grains and a consequent cylindrical surface of the porous material. The surface of the porous material is preferably closed so that an improved contact is achieved between the porous material 14 and the jacket 12.

Last, referring to FIG. 9D, in this case the porous material 14 has been pressed through a calibration ring to ensure it has a precisely defined size. This causes some deformation of the particles of the porous material that come into contact with the calibration ring as it is pushed through and so a good fit and good conductive engagement with the jacket 12 is achieved.

The point to point contact between the individual particles of the porous material acts as a restriction for heat conduction through the sintered/porous material. In view of the desirability of keeping the unit small, the heat-conductive flow deflectors described above serve to increase the conduction of heat from the jacket 12 to within the heater 6.

Overall, gas flowing through the heater is heated up with high efficiency due to the substantial heat transfer surface provided by the heat exchanger. Furthermore, if a heat deflector is used, transfer of heat to the heat exchanger can be improved and the route of gas flowing through the heater may be controlled to prolong the residence time of gas within the heater 6.

The flow deflector is arranged so that it can divert the flow of gas within the heater 6. However, it will be appreciated that the flow of gas through the heater is such that at all times during the flow of gas, the distance between the flow of gas and a heat transfer surface through which the heat exchanger is arranged to receive heat, preferably remains substantially constant.

The maximum temperature difference between the heat exchange surface of the heat exchanger and gas flowing through the heater is limited by the fact that it is desirable to maintain the outside surface temperature of the heater 6 or jacket 12 or the connections to the heater or jacket at a safe temperature, i.e. at a temperature at which a user will not be burned if direct contact is inadvertently made with the heater or jacket by a user's hand. In the case where a spiral heat deflector is used with an internal heat cartridge (as shown in FIGS. 7 and 8), this difference can be larger. This is because in use a temperature gradient will exist between the heat source and part of the heater farthest from the heat source. If the heat source is arranged internally with respect to the jacket 12, the temperature gradient is such that the outside of the jacket 12 will be cooler than the heat source. The heat source can therefore be made hotter if it is arranged substantially along a central longitudinal axis of the heater 6. The heater efficiency per unit length of the heater therefore improves.

Any suitable heat source may be used with the heater and it may be integrally arranged within the heater and/or provided as a changeable or removable part. It is preferred that an electrical resistance cartridge is used fitted into either the solid heater jacket as described above with reference to FIGS. 3A to 3I or within a central core of a heat-conductive flow deflector 30 as described above with reference to FIGS. 7 and 8. As an alternative, a heater jacket may be used, wrapped around the jacket 12. In the case of using an electrical resistance cartridge, the cartridge can be either the full length of the porous heat exchange element or only a partial length thereof. Other alternatives include the use of warm liquid or gas, steam, molten metal or radiation heat. In each case arrangement of the heater is such that the heat can be coupled to the heater from the heat source.

Figure 10:
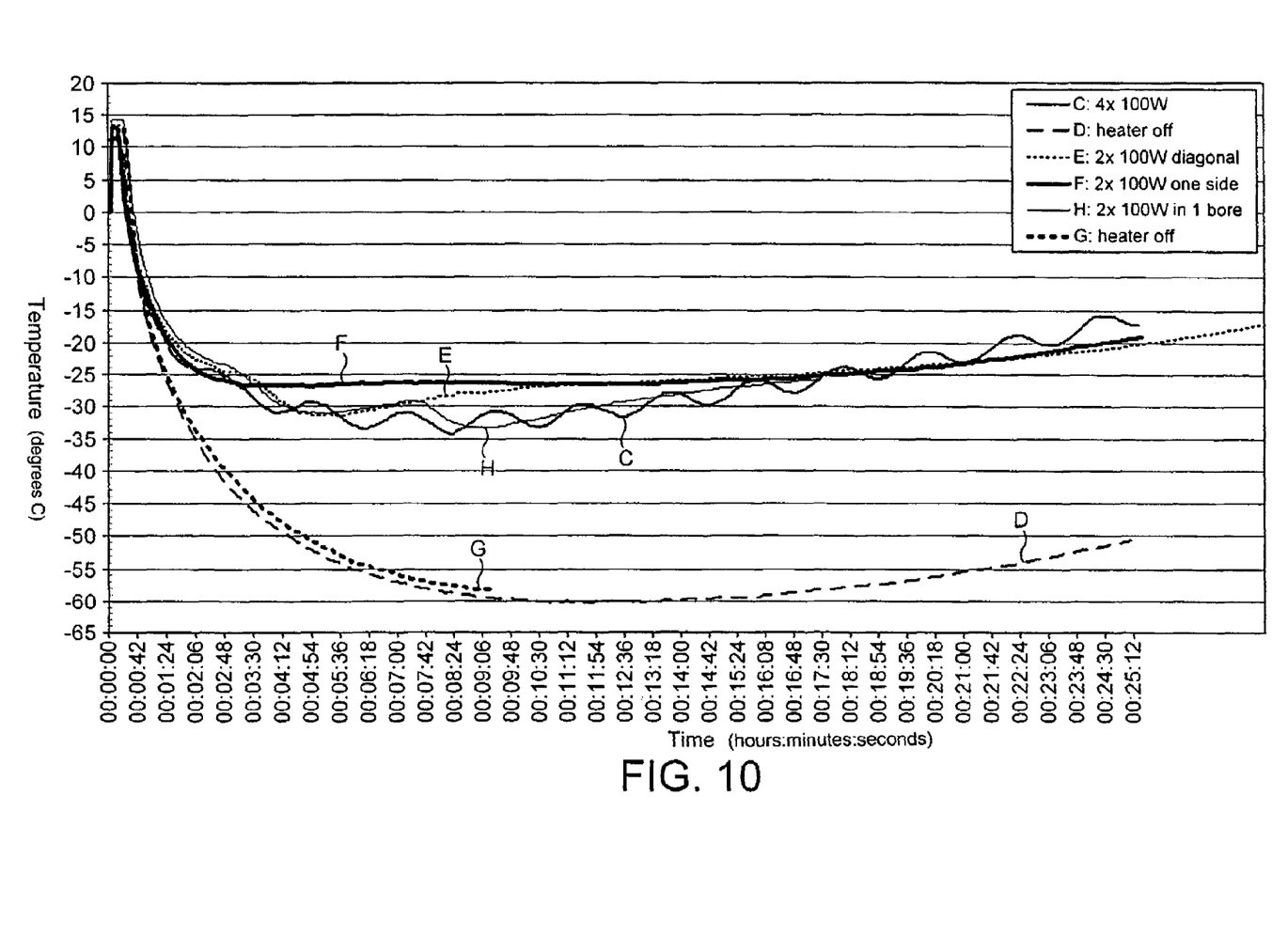

FIG. 10 is a graph showing the variation of temperature of a gas flowing through a gas supply apparatus as shown in either of FIGS. 1A or 1B. The graph shows the variation in temperature of gas for six different arrangements of heat source.

The examples shown by lines C, E, F and H show examples in which electrical resistance cartridges are fitted into the jacket of the heater as described above with reference to FIGS. 3A to 3I.

The lines D and G show the situation in which the heat source or sources is or are off. As can be seen, as time progresses the temperature of the gas goes below −55° C. due to the Joule-Thomson effect.

It can be seen that in the situations where heaters according to examples of embodiments of the present invention are used, the temperature of gas that has passed through the heater is raised significantly.

It will be appreciated that numerous modifications to and departures from the preferred embodiments described above will occur to those having skill in the art. Thus, it is intended that the present invention covers the modifications and variations of the invention, provided they come within the scope and spirit of the appended claims and their equivalents.

The invention claimed is:

1. A gas heater for connection to a heat source and a pressurised gas source, the gas heater comprising:
   a jacket having a gas inlet and a gas outlet and defining a cavity therebetween and comprising a cylinder made of a heat-conductive material;
   a porous heat exchanger extending within said cavity, from said inlet to said outlet, wherein the heat exchanger is in heat-conductive communication with the jacket to enable transfer of heat from the jacket to the heat exchanger;
   a flow deflector arranged within the jacket, the flow deflector arranged in use to direct gas along a tortuous route through the heat exchanger and comprising either a disk or a spiral thread; and
   a heat provider for providing heat to said heat exchanger along the length thereof, wherein the jacket is adapted to receive a heating element and to conduct heat from the heating element to the porous heat exchanger contained therein.

2. A gas heater according to claim 1, in which the heat exchanger is arranged to substantially fill the jacket.

3. A gas heater according to claim 2, in which the porous heat exchanger is made from a material selected from the group consisting of copper, brass, bronze, aluminum, steel, stainless steel or other ferrous and non ferrous metals and their alloys.

4. A gas heater according to claim 3, in which the porous heat exchanger is formed of grains of a conductive porous material, the grains being one or more of spherical, ovoid, polyhedral or plate like.

5. A gas heater according to claim 4, wherein grains of the porous material are bonded to each other by one or both of pressing and sintering.

6. A gas heater according to claim 1, in which the jacket is made from a heat-conductive material selected from the group consisting of copper, brass, bronze, aluminum, steel, stainless steel and their alloys and other ferrous and non ferrous metals any or all of these being reinforced with composite material.

7. A gas heater according to claim 1, in which the flow deflector is heat-conductive.

8. A gas heater according to claim 1, in which the spiral thread deflector comprises a substantially central axial bore for receiving a heat source.

9. A heater according to claim 1, comprising a heat source for providing heat to the heater.

* * * * *